Patented Oct. 31, 1944

2,361,802

UNITED STATES PATENT OFFICE 2,361,802

PRODUCING CARBON BLACK

Ira Williams and Robert Boyce Takewell, Borger, Tex., assignors to J. M. Huber Corporation, Borger, Tex., a corporation of Delaware No Drawing. Application September 4, 1941, Serial No. 409,564

4 Claims. (Cl. 23—209.8)

This invention relates to the production of carbon black by the impingement process and more particularly to a method for controlling and improving the quality of the carbon black.

It has been proposed to produce carbon by the incomplete combustion of mixtures of gas and air in suitable furnaces. It has also been proposed to produce carbon by the explosion of mixtures of gas and air under compression. It has further been proposed to produce carbon by passing a mixture of hydrocarbon gas and other gases over heated refractory checkerwork. However, none of such processes have been able to produce carbon having the desirable properties of the carbon black obtained by the impingement process. Accordingly, none of these processes have been able to replace the impingement process.

The impingement process comprises burning a hydrocarbon gas emitted from lava tips and causing the flames thereof to impinge on a cooled collecting surface whereby carbon is deposited on the collecting surface from which it is removed by scraping or other suitable means. In this process the control of the quality of the carbon has been difficult and has depended largely upon the skill and the experience of the particular operator. A change in the quality of the carbon, thus obtained, has usually entailed a number of variable factors, such as the distance of the lava tip from the collecting surface, the width of the slot in the burner tip, the amount of gas burned per tip, the amount of draft opening at the bottom and at the top of the burner house, the distances by which the flames are separated and the temperature of the collecting surface. By the proper control of such variables, the yield of the carbon could be influenced and the quality altered to produce carbon black of different properties and different colors ranging from brown to deep blue black.

The alteration of the impingement process to produce a different quality of carbon black usually involves a great deal of time and labor and is very expensive. For example, the change from the production of a relatively soft carbon, suitable for use in tire treads, to a hard highly colored carbon, usually requires changing many thousands of lava burner tips to other tips having considerably narrower slots. This operation, not only requires considerable time and labor, but also, requires a capital outlay for burner tips of different sizes and a considerable loss through the breakage of burner tips in the handling thereof.

It is an object of the present invention to provide a method for controlling the reinforcing and electrical conducting properties of carbon black to be employed in rubber. Another object is to provide a method for controlling the color of carbon black produced by the impingement process. A further object is to provide a simple and inexpensive method for altering the quality of carbon black obtained by the impingement process which does not involve material alterations in the equipment. A still further object is to provide a method for altering the properties of impingement carbon black, which method is subject to precise and analytical control. Other objects are to advance the art. Still other objects will appear hereinafter.

The above and other objects may be accomplished by our invention which comprises mixing with the hydrocarbon, which is to be burned in an impingement process, a minor proportion of a non-combustible inert gas, such as air, nitrogen, carbon dioxide, oxygen and water vapor generally in the proportion of from about 0.05 to about 1.0 volume of the inert gas to each volume of the hydrocarbon. We have found that, by such process, we are able to control the properties of the carbon black produced, particularly increasing the electrical conductivity of carbon black in rubber, other conditions remaining the same. Also, by such process, we are able to control the color of the carbon black between a brown to a deep blue black. Furthermore, by our process, the temperature of the flame is not materially affected and the yield of carbon is not greatly reduced so that high yields of carbon of the desired quality can be obtained.

As little as 0.05 volume of the inert gas produces a noticeable change in the quality of the carbon and, in many cases, will be sufficient. As the amount of the inert gas employed is increased, the electrical conductivity of the carbon black is increased and the carbon black becomes darker in color until the amount of inert gas reaches a value between 0.5 and 1 volume for each volume of the hydrocarbon, generally nearer to 1 volume of inert gas for each volume of hydrocarbon. However, practically all of the effect of the inert gas has been obtained by the time the proportions have reached 0.5 volume of inert gas to each volume of the hydrocarbon. Furthermore, the yield of carbon black begins to drop rapidly as the proportion of inert gas rises above 0.5 volume to each volume of the hydrocarbon gas. If the inert gas employed is air and the hydrocarbon gas is natural gas, the yield of carbon black is very small when the amount of the air rises above 0.5 volume and, when the amount of air to natural gas reaches the proportion of 1 volume of air to 1 volume of natural gas, the yield of carbon black is decreased to only about 0.1 lb. per 1000 cubic feet of gas. When more than an equal volume of inert gas is employed, the yield of carbon black is still further reduced until, at about 4.5 volumes of inert gas to 1 volume of natural gas, no carbon black will usually be obtained. Hydrocarbons, rich in carbon, such as benzene, generally require a somewhat higher proportion of the inert gas than hydrocarbons poor in carbon, such as methane, for the maximum effects. While methane usually requires from about 0.2 to about 0.4 volume of inert gas for each volume of the hydrocarbon, hexane and benzene may require as much as an equal volume of the inert gas to produce the maximum results. In the commercial operation of our process, we usually prefer to employ from about 0.1 to about 0.5 volume of inert gas to each volume of the hydrocarbon and, when the inert gas is air and the hydrocarbon is natural gas, we prefer to employ from about 0.1 to about 0.4 volume of air to each volume of natural gas.

In order to more clearly illustrate our invention, the preferred modes of carrying the same into effect and the advantageous results to be obtained thereby, the following examples are given:

Example I

A carbon black unit was equipped with lava tips having slots 0.044 inch in width. The tips were spaced at 4½ inch intervals 2¾ inches below the surface of the collecting channels. Natural gas was burned at the rate of 2.25 cubic feet per tip per hour. Various amounts of air were mixed with the gas and the volume of the mixture was increased sufficiently to maintain a flow of 2.25 cubic feet of gas per tip per minute. No alterations were made in the plant during the progress of the series of tests. The carbon black was collected in each case and its properties examined. The tensile strength and electrical properties in rubber were determined with a compound containing 50 parts by weight of carbon black in 100 parts of rubber. The color was examined by incorporating the carbon black in linseed oil. The following results were obtained:

| Volumes of air per volume of gas | Maximum tensile of rubber, lbs./in.² | Resistivity of rubber, ohm cms. |
|---|---|---|
| 0.0 | 4,300 | 100,000 |
| 0.1 | 4,530 | 7,600 |
| 0.2 | 4,650 | 1,800 |
| 0.3 | 4,690 | 950 |
| 0.4 | 4,760 | 400 |

The color intensity and oil absorption increased regularly as the amount of air in the gas was increased.

Example II

Carbon black was prepared by burning natural gas, which contained 0.3 volume of various inert gases to each volume of the natural gas, to produce flames which impinged against carbon collecting channels. The carbon black was incorporated into a rubber compound and, after vulcanization, the resistivity of the rubber compound was determined.

| Inert gas | Resistivity, ohms cms. |
|---|---|
| None | 127,000 |
| Nitrogen carbon dioxide mixture [1] | 780 |
| Nitrogen | 610 |
| Carbon dioxide | 540 |
| Steam | 595 |

[1] This mixture contained 79% nitrogen and 21% carbon dioxide.

In all cases, the mixture of natural gas and inert gas produced a more intensely black pigment.

Example III

Various hydrocarbon vapors were mixed with air, and carbon was produced by impinging the flame on a collecting surface. The carbon was incorporated into rubber and, after vulcanization, the resistivity was determined.

| Hydrocarbon | Volumes of air per volume of gas | Resistivity, ohm cms. |
|---|---|---|
| Propane | .0 | 2,700,000 |
|  | .20 | 800,000 |
|  | .40 | 3,200 |
| Benzene | .0 | 2,600,000 |
|  | .20 | 1,600,000 |
| Hexane | .0 | 2,450,000 |
|  | .20 | 22,000 |

It will be understood that the above examples have been given for illustrative purposes only and that our invention is not to be limited to the specific embodiments disclosed therein, but we intend to claim our invention broadly as in the appended claims. It will be readily apparent to those skilled in the art that many variations and modifications can be made without departing from the spirit or scope of our invention. Our invention is directed to improvement in the usual carbon black impingement process, wherein the usual carbon black producing equipment is employed, but our invention has the advantage that, once the equipment is in operation, carbon black of a wide variety of properties can be obtained without changing burner tips or making other time consuming, laborious and expensive alterations in the equipment or its adjustment.

No method or apparatus for introducing the inert gas into the hydrocarbon gas is illustrated herein, since many methods and apparatus, suitable for regulating the mixture and subject to ready control of the operator, will be apparent to those skilled in the art.

By the term "lower" aliphatic hydrocarbon, we mean hydrocarbons of from 1 to 6 carbon atoms.

We claim:

1. In the method of producing carbon black by the impingement process wherein natural gas is burned and the flame is caused to impinge on a cool collecting surface to deposit carbon thereon, the process of controlling the quality of the carbon black produced which comprises the steps of mixing the natural gas, prior to its issue from the burner provided therefor, with from 0.05 to about 0.5 volume of an inert non-combustible gas for each volume of the natural gas, and then burning the resulting mixture.

2. In the method of producing carbon black by the impingement process wherein natural gas is burned and the flame is caused to impinge on a cool collecting surface to deposit carbon thereon, the process of controlling the quality of the carbon black produced which comprises the steps of mixing the natural gas, prior to its issue from the burner provided therefor, with from 0.05 to about 0.5 volume of an inert non-combustible gas of the group consisting of air, nitrogen, carbon dioxide, oxygen, water vapor and mixtures of at least two thereof for each volume of the natural gas, and then burning the resulting mixture.

3. In the method of producing carbon black by the impingement process wherein natural gas is burned and the flame is caused to impinge on a cool collecting surface to deposit carbon thereon, the process of controlling the quality of the carbon black produced which comprises the steps of mixing the natural gas, prior to its issue from the burner provided therefor, with from 0.05 to about 0.5 volume of air for each volume of the natural gas, and then burning the resulting mixture.

4. In the method of producing carbon black by the impingement process wherein natural gas is burned and the flame is caused to impinge on a cool collecting surface to deposit carbon thereon, the process of controlling the quality of the carbon black produced which comprises the steps of mixing the natural gas, prior to its issue from the burner provided therefor, with from 0.1 to about 0.5 volume of air for each volume of the natural gas, and then burning the resulting mixture.

IRA WILLIAMS.
ROBERT B. TAKEWELL.